United States Patent [19]

Kawano

[11] Patent Number: 4,700,799

[45] Date of Patent: Oct. 20, 1987

[54] FRAMELESS MOTORCYCLE

[75] Inventor: Akio Kawano, Saitama, Japan

[73] Assignee: Honda Giken Kogyo Kabushiki Kaisha, Tokyo, Japan

[21] Appl. No.: 877,895

[22] Filed: Jun. 24, 1986

[30] Foreign Application Priority Data

Jun. 25, 1985 [JP] Japan ................................ 60-138185

[51] Int. Cl.[4] ...................... B62K 25/16; B62K 25/20
[52] U.S. Cl. .................................. 180/219; 280/275; 280/284
[58] Field of Search ................ 180/219; 280/274, 275, 280/283, 284, 660

[56] References Cited

U.S. PATENT DOCUMENTS 4,265,329  5/1981  de Cortanze ........................ 180/219
4,526,249  7/1985  Parker ................................ 180/219

Primary Examiner—David M. Mitchell
Assistant Examiner—Donn McGiehan
Attorney, Agent, or Firm—Irving M. Weiner; Joseph P. Carrier; Pamela S. Burt

[57] ABSTRACT

A frameless motorcycle (1) comprises a front suspension (7, 8, 9, 11, 12, 13, 5a, 5b) including an upper front swing arm (7) and a lower front swing arm (8) cooperating with each other to support a front wheel (10) at the front ends thereof, a rear wheel (15), and an attachment member (3) which has a bottom wall portion (6) and left and right side wall portions (5, 5) continued to the left and right ends of the bottom wall portion (6), when viewed from ahead of the vehicle, and to which an engine (4) is attached. The upper and lower front swing arms (7, 8) are pivotably attached at rear end parts thereof to the side wall portions (5, 5) of the attachment member (3), such that the parts of the lower arm (8) attached to the side wall portions (5, 5) are offset inwardly of the vehicle by a predetermined distance (l) with respect to the parts of the upper arm (7) attached to the side wall portions (5, 5).

4 Claims, 6 Drawing Figures

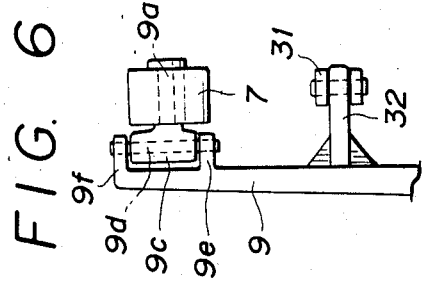
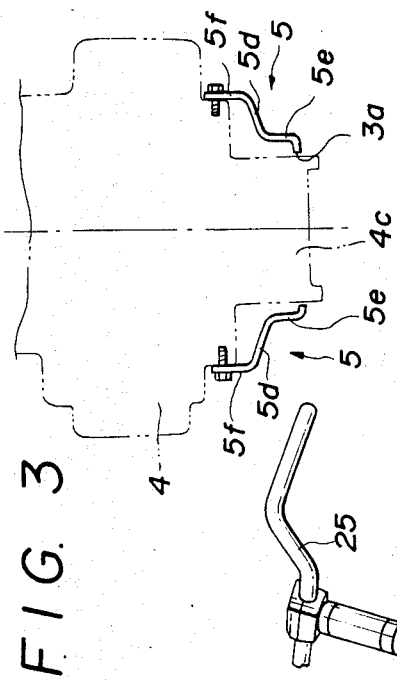
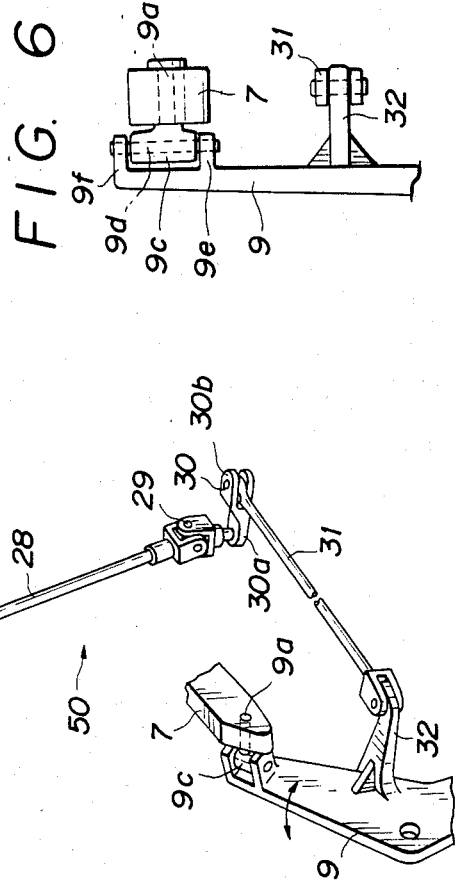
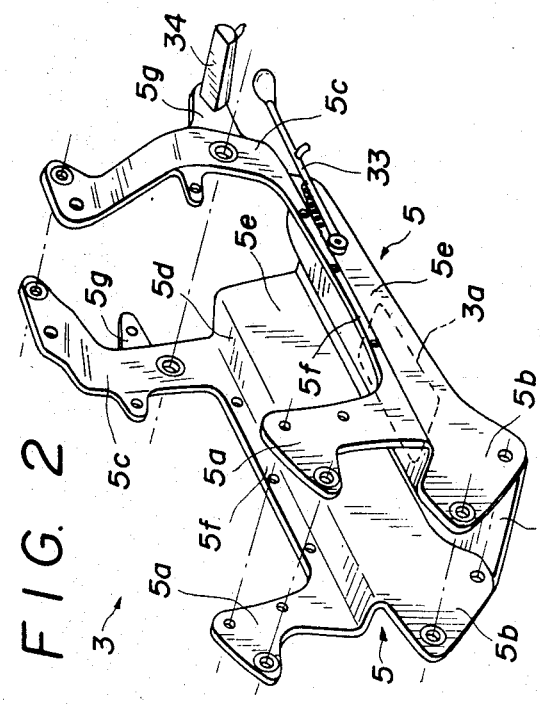
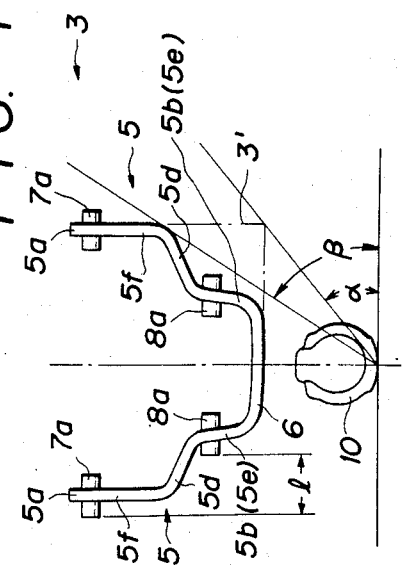

FRAMELESS MOTORCYCLE

BACKGROUND OF THE INVENTION

1. Field of the Invention

The present invention generally relates to a motorcycle. More particularly, the invention relates to a frameless motorcycle constituted such that a swing arm adapted to support a front wheel at the front end thereof is pivotably attached at its rear end to the front part of a power unit disposed in the middle of the vehicle, without employing a so-called vehicle body frame.

2. Description of Relevant Art

Conventionally, most general motorcycles have been of a type employing a so-called vehicle body frame.

In this respect, in recent years, there have been proposed motorcycles of a type constituted, without employing a vehicle body frame, such that a swing arm supporting a front wheel at the front end thereof is pivotably attached at its rear end to the front part of a power unit disposed in the middle of the vehicle. Thus, in this type of motorcycle a front fork, as conventionally used, is omitted. As an example thereof, there is one that is disclosed in U.S. Pat. No. 4,265,329.

In the frameless motorcycle according to the United States Patent above, a plate member is fixed to the front end of an engine of a power unit arranged in the longitudinal direction of the vehicle, and a pair of swing arms, arranged one above the other and adapted to steerably support a front wheel at the front ends thereof, are vertically swingably pivoted at the respective rear ends thereof on the plate member.

Moreover, in the United States Patent above, it is suggested that the engine itself may have a projected portion to substitute for the plate member.

Further, with respect to the motorcycle according to the United States Patent above, it is said that, because of the omission of what is called a vehicle body frame, the vehicle weight is reduced in comparison with motorcycles of the type employing a vehicle body frame.

In the motorcycle according to the United States Patent above, however, since the swing arms are pivotably attached substantially to the engine itself, the strength and rigidity of the engine itself are required to be correspondingly secured, thus raising such a problem that the engine as well as the entirety of vehicle may be restricted in freedom of design.

With such points in mind, the present invention has been achieved to effectively solve a problem in conventional frameless motorcycles.

SUMMARY OF THE INVENTION

Accordingly, an object of the present invention is to provide a frameless motorcycle which is relatively high of freedoms in the design of an engine as well as of the entirety of the vehicle.

To achieve this object, the present invention provides a frameless motorcycle comprising a front wheel, a suspension for the front wheel, the suspension including an upper front swing arm and a lower front swing arm cooperating with each other to support the front wheel at the front ends thereof, a rear wheel, an engine, and an attachment member consisting of a bottom wall portion and left and right side wall portions continued to the left and right ends of the bottom wall portion when viewed from ahead of the vehicle, the attachment member having the engine attached thereto, both of the front swing arms being pivotably attached at rear end parts thereof to the side wall portions of the attachment member, and the parts of the lower front swing arm attached to the side wall portions of the attachment member being offset inwardly of the vehicle by a predetermined distance from the parts of the upper front swing arm attached to the side wall portions of the attachment member.

The above and further features, objects and advantages of the present invention will more fully appear from the following detailed description of the preferred embodiment of the invention when the same is read in conjunction with the accompanying drawings.

BRIEF DESCRIPTION OF THE DRAWINGS

FIG. 2 is a perspective view of an attachment member which is used in the motorcycle.

FIG. 3 is a sectional front view at a longitudinally intermediate part of the attachment member.

FIG. 4 is a schematic front view of the attachment member.

FIG. 5 is a perspective view of an essential part of a front-wheel steering system of the motorcycle.

FIG. 6 is an enlarged partial front view of a steering plate in the steering system of FIG. 5.

DETAILED DESCRIPTION OF THE PREFERRED EMBODIMENT

Figure 1:
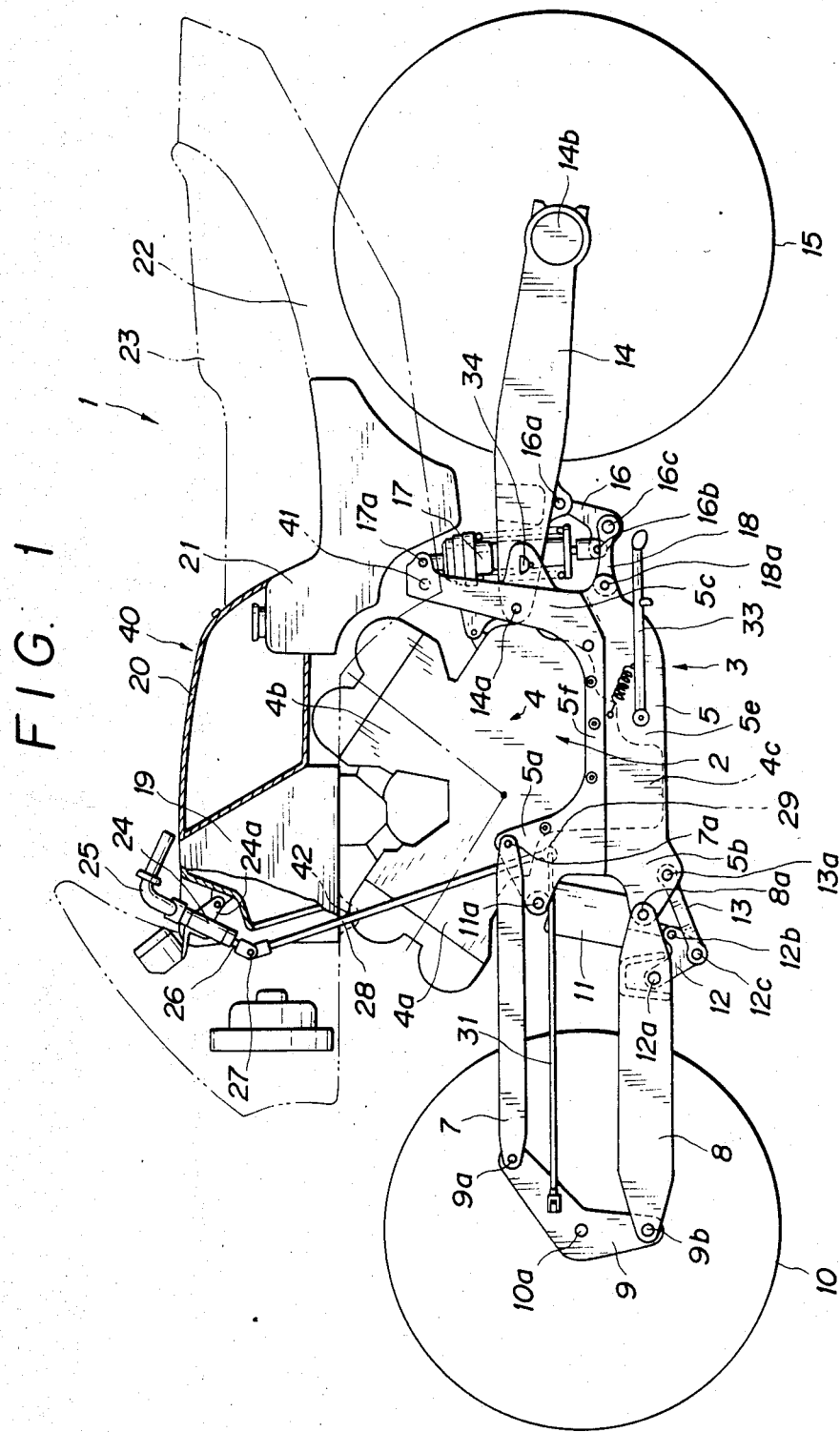
FIG. 1 is a side view of a frameless motorcycle according to a preferred embodiment of the present invention.

Referring first to FIG. 1, designated at reference numeral 1 is a frameless motorcycle according to a preferred embodiment of the present invention. The motorcycle 1 includes a power unit 2 disposed at a longitudinally and transversely middle position of the vehicle. The power unit 2 comprises a later-detailed attachment member 3 having a substantially U-shaped form in side view and an offset channel form in front view, and a V-type engine 4 mounted on the attachment member 3. The member 3 is integrally formed by way of an aluminum die casting. The engine 4 includes a front cylinder 4a diagonally extending to the upper front and a rear cylinder 4b diagonally extending to the upper rear, and has an oil pan 4c at the bottom part thereof. Incidentally, the attachment member 3 may be made of a steel plate, or a laminate of an aluminum plate and a carbon-fiber reinforced resin or of a fiber reinforced resin panel and an aluminum honeycomb plate.

Referring now to FIGS. 2 to 4, the attachment member 3 comprises a bottom wall portion 6 and left and right side wall portions 5, 5 continued at the lower ends thereof to the left and right ends of the bottom portion 6, respectively, when viewed from ahead of the vehicle. The member 3 also has a substantially symmetrical form with respect to the longtitudinal centerplane. The wall portions 5, 5 are composed of lower side wall parts 5e, 5e upwardly and slightly sidewardly extending from the left and right ends of the bottom portion 6, inclined wall parts 5d, 5d transversely outwardly extending, while slightly ascending, continuously from the lower side wall parts 5e, 5e, and upper side wall parts 5f, 5f upwardly extending from the left and right ends of the inclined wall parts 5d, 5d, respectively. The lower side wall parts 5e, 5e are formed at the front parts thereof with diagonally hanging parts 5b, 5b directed to the lower front, respectively, and each of the upper side wall parts 5f, 5f is formed at the front and rear parts thereof with a front standing part 5a diagonally extending to the upper front and a rear standing part 5c diagonally extending to the upper rear, respectively. Moreover, the bottom wall portion 6 has formed through the central part thereof an opening 3a for fitting therein the oil pan 4c of the engine 4, as shown in FIG. 3. The provision of the opening 3a facilitates replacement of oil and, besides, improves heat radiation of the attachment member 3.

Incidentally, the attachment member 3 has a side stand 33 attached to the lower side wall part 5e of the left side wall portion 5 thereof. Moreover, at each side of the vehicle, the rear standing part 5c of the side wall portion 5 has formed on the rear edge thereof a rearwardly projected bracket part 5g for attaching thereto a footstep 34.

Referring again to FIG. 1, in the frameless motorcycle 1, an axle 10a of a front wheel 10 is rotatably supported by means of a steering plate 9 of an obtusely angled L-form in side view. The plate 9 is rotatably attached through pivots 9a, 9b at the upper and lower ends thereof to the front ends of an upper front swing arm 7 and a lower front swing arm 8, respectively. Then, the upper and lower arms 7, 8 are pivotably attached through bearings 7a, 8a at below-described rear parts thereof to the uppermost part of the front standing part 5a and the foremost part of the diagonally hanging part 5b of each of the left and right side wall portions 5, 5 of the attachment member 3, respectively.

In this respect, the upper arm 7 has a straight or linear arm-like form in side view, but in plan view it is substantially shaped in the form of a small letter "h", though not illustrated. In other words, the rear part of the arm 7 is bifurcated, and the rear ends of bifurcations thereof are respectively pivotably attached to the corresponding front standing part 5a of the left and right side wall portions 5, 5. Likewise, the lower arm 8 also has a straight or linear arm-like form in side view, but in plan view it is substantially shaped in the form of a small letter "h", though unshown. Namely, the rear part of the arm 8 is also bifurcated, and the rear ends of bifurcations thereof are respectively pivotably attached to the corresponding hanging part 5b of the left and right side wall portions 5, 5. Incidentally, the front halves of the respective arms 7, 8 are outwardly curved to the left of the vehicle to avoid interfering with the front wheel 10 when this is steered to the right.

As will be seen from FIG. 1, the aforementioned steering plate 9, upper and lower arms 7, 8, front standing parts 5a, 5a, and hanging parts 5b, 5b are adapted to cooperate with each other to constitute a four-link type front suspension of a substantially Parallelogram-shaped form in side view.

Between the front ends of the respective front standing parts 5a, 5a is transversely stretched a shaft 11a, and between the respective hanging parts 5b, 5b, a shaft 13a.

To the lower arm 8 is connected, at a transversely middle position of the vehicle, to an upper end part 12a of a link 12 shaped in the form of a letter "L" in side view. Then, between a rear end part 12b of the link 12 and the transverse shaft 11a there is interposed a front damper 11 which is disposed at a transversely middle position of the vehicle, and between a bent intermediate part 12c of the link 12 and the transverse shaft 13a there is interposed a link 13 of a bar-like form in side view, which link 13 has the form of a capital letter "H" in plan view. As a matter of course, the connection between the lower arm 8 and the L-link 12 is made pivotable. Similarly, the connections between the damper 11 and the link 12 and shaft 11a and those between the bar link 13 and the link 12 and shaft 13a are also pivotable.

By such arrangement of the links 12, 13, the damper 11 is adapted to exhibit a progressive damping function against vertical movements of the front wheel 10.

In the foregoing constitution, the upper and lower arms 7 and 8 are attached at rear end parts thereof through the bearings 7a, 7a and 8a, 8a to the attachment member 3, respectively, such that the attached rear end parts of the arm 8 are transversely inwardly offset by a predetermined distance 1 from the attached rear end parts of the arm 7, respectively, as shown in FIG. 4. In this respect, at each side of the vehicle, the lower part 5e and the inclined part 5d of the side wall portion 5 are formed so as to constitute, as a whole, a transversely inwardly curved transition part between the bottom wall portion 6 and the upper part 5f of the side wall portion 5 of the attachment member 3. In other words, the transition part between bottom and side wall portions of the attachment member 3 is inwardly curved toward the centerline of the vehicle.

Further, in the frameless motorcycle 1, a rear swing arm 14 of a straight or linear form in side view is pivotably attached at a below-described front part 14a thereof to the rear standing part 5c of each of the left and right side wall portions 5, 5 of the attachment member 3, substantially at a vertically middle position of the latter 5c, on the transversely inner side thereof. The rear arm 14 rotatably supports a rear wheel 15 at a rear part 14b thereof. The rear arm 14 has the form of a small letter "h" as inverted and reversed in plan view, though unshown. Thus, the front part 14a of the arm 14 is also bifurcated, and the front ends of bifurcations thereof are respectively pivotably attached to the corresponding rear standing part 5c of the left and right side wall portions 5, 5.

Then, similarly to the case of the fornt damper 11, a rear damper 17 is installed at a transversely middle position of the vehicle so as to cooperate with the rear arm 14 to constitute a rear suspension.

Namely, between the upper ends of the respective rear standing parts 5c, 5c is transversely stretched a shaft 17a, and between the rear ends of the respective lower side wall parts 5e, 5e, a shaft 18a. Moreover, a link 16 shaped in the form of a letter "L" in side view is connected at a rear end part 16a thereof to the rear swing arm 14, at a bifurcated central part of the latter 14, on the lower surface thereof, in a transversely middle region of the vehicle. Further, between a front end part 16b of the link 16 and the transverse shaft 17a there is interposed the rear damper 17 disposed at the transversely middle position of the vehicle, and between a bent intermediate part 16c of the link 16 and the transverse shaft 18a there is interposed a link 18 of a bar-like form in side view, which link 18 has the form of a capital letter "H" in plan view. Then, the connection between the L-link 16 and the rear arm 14. The connections between the damper 17 and the link 16 and shaft 17a and those between the bar link 18 and the link 16 and shaft 18a are made pivotable.

By such arrangement of the links 16, 18, the rear damper 17, also, is adapted to exhibit a progressive damping function against vertical movements of the rear wheel 15.

Still further, in the frameless motorcycle 1, there is provided, above the attachment member 3, an upper subsidiary assembly 40 including an air cleaner case 19 for accommodating an air cleaner (not shown), the case 19 being made of steel sheet, a container box 20, and a fuel tank 21. The assembly 40 has, at the lower front part thereof, left and right side portions 42, 42 thereof both fixed to the front cylinder 4a of the engine 4 and, at the lower middle part thereof, left and right side portions 41, 41 thereof fixed to the upper ends of the rear standing parts 5c, 5c of the left and right side wall portions 5, 5 of the attachment member 3, respectively. The cleaner case 19, container box 20, and fuel tank 21 are covered with a cowling 22. Moreover, behind the container box 20, on the fuel tank 21, there is disposed a driver's seat 23 which is configured to be continuous to the container box 20.

The cleaner case 19 made of steel has at the central part of the front surface thereof a pipe member 24 fixed thereto through a stay 24a. In the pipe member 24 is rotatably inserted a steering shaft 26 which is adapted to turn to the left and right following steering operations of a handlebar 25.

In this connection, a front-wheel steering system of the frameless motorcycle 1 is shown in FIG. 5.

The steering system 50 comprises the aforementioned steering shaft 26, a control rod 28 connected at the upper end thereof through a universal joint 27 to the lower end of the steering shaft 26, an angle piece 30 connected, at a base part 30a as a transversely inner part thereof with respect to the vehicle, through another universal joint 29 to the lower end of the control rod 28, and a longitudinally arranged link member 31 interposed between a bifurcated part 30b, as a transversely outer part of the angle piece 30, and a transversely outwardly projected part 32 of the aforementioned steering plate 9. The base part 30a of the angle piece 30 is rotatably supported by an unshown support, which may be a part of a projection formed on the transversely inner side of the aforementioned front standing part 5a of the left side wall portion 5 of the attachment member 3, so that the piece 30 is turnable about a pivoting axis of the base part 30a in a horizontal plane. The, to the bifurcated part 30b of the angle piece 30, the rear end of the longitudinal link member 31 is so connected that the link member 31 is vertically swingable about the bifurcated part 30b within a predetermined angle range, whereas the member 31 is horizontally pivotable and longitudinally movable as a matter of course.

In the foregoing constitution of the steering system 50, when the handlebar 25 is steered to the left and right, the angle piece 30 horizontally turns about the axis of the base part 30a, thereby causing the link member 31 to move substantially in the longitudinal direction of the vehicle.

Incidentally, the vertically arranged steering plate 9 is transversely rockably supported at the upper and lower ends thereof by means of the aforementioned pivots 9a, 9b through which the plate 9 is pivotably attached to the upper and lower front swing arms 7, 8, respectively. The structure of the upper pivot 9a is similar to that of the lower pivot 9b, and only the former is shown into details in FIG. 6 as well as in FIG. 5.

The pivot 9a has a cylindrical hollowed base part 9c through which a pivot pin 9d is rotatably arranged so as to vertically extend between a pair of projections 9e, 9f that are projected to the left of the vehicle from the upper part of the steering plate 9. In this respect, the pivot 9b also has a similar pivot pin (not shown) arranged therethrough, and the axis of rotation of this pivot pin is coincident with that of the pivot pin 9d.

Accordingly, in the steering system 50, when the handlebar 25 is steered to the left and right, the link member 31 longitudinally moves as described, whereby the steering plate 9 is caused to rock about the pivot pin 9d of the pivot 9a, as well as about the pivot pin of the pivot 9b, in the direction of the arrow of FIG. 5, thus turning the front wheel 10 to the left and right.

In the frameless motorcycle 1 according to the present embodiment, the front arms 7, 8 are swingably attached to the attachment member 3, but not to the engine 4 itself. Likewise, the rear arm 14 also is swingably attached to the attachment member 3. Therefore, the strength and rigidity of the engine 4 itself are not required to be set so large as otherwise would have to be secured. Thus, the engine 4 as well as the entirety of the motorcycle 1 is permitted to have improved freedom in design. In this respect, it will be easily understood that the engine 4 is not limited to the V-type, but may advantageously be of any desired type or configuration.

Moreover, in the frameless motorcycle 1, the attachment member 3 has an inwardly curved cross section, as shown by solid line in FIG. 4, so that it is permitted to have larger strength and rigidity than would be expected when configured in such a true-channel form as illustrated by dotted line 3' in the same Figure.

Further to this point, if configured in such a true-channel form as shown by dotted line 3', the resulting attachment member might well restrict the maximum bank angle of the motorcycle to a relatively small angle α. However, in the present embodiment, the rear end parts of the lower arm 8 attached to the attachment member 3 are transversely inwardly offset by distance l with respect to the rear end parts of the upper arm 7 attached to the attachment member 3, so that the motorcycle 1 is permitted to have a maximum bank angle β sufficiently larger than the aforesaid bank angle α at both sides of the vehicle.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

What is claimed is:

1. A frameless motorcycle (1) comprising:
 a front wheel (10);
 a suspension (7, 8, 9, 11, 12, 13, 5a, 5b) for said front wheel (10), said suspension including an upper front swing arm (7) and a lower front swing arm (8) cooperating with each other to support said front wheel (10) at the front ends thereof;
 a rear wheel (15);
 an engine (4); and
 an attachment member (3) consisting of a bottom wall portion (6) and left and right side wall portions 5, 5 continued to the left and right ends of said bottom wall portion (6) when viewed from ahead of the vehicle;
 said attachment member (3) covering the lower portion of said engine (4) attached thereto;
 both of said front swing arms (7,8) being pivotably attached at rear end parts thereof to said side wall portions (5,5) of said attachment member (3); and the parts of said lower front swing arm (8) attached to said side wall portions (5,5) of said attachment member (3) being offset inwardly of the vehicle by a predetermined distance (l) from the parts of said upper front swing arm (7) attached to said side wall portions (5,5) of said attachment member (3).

2. A frameless motorcycle according to claim 1, further comprising:
   a suspension (14, 16, 17, 18) for said rear wheel (15), including a rear swing arm (14) for supporting said rear wheel (15) at the rear end thereof; and
   said rear swing arm (14) is pivotably attached at the front end thereof to said side wall portions (5, 5) of said attachment member (3).

3. A frameless motorcycle according to claim 1, wherein:
   said bottom wall portion (6) of said attachment member (3) is formed with an opening (3a) for fitting therein an oil pan (4c) of said engine (4).

4. A frameless motorcycle (1) comprising:
   a front wheel (10);
   a suspension (7, 8, 9, 11, 12, 13, 5a, 5b) for said front wheel (10), said suspension including an upper front swing arm (7) and a lower front swing arm (8) cooperating with each other to support said front wheel (10) at the front ends thereof;
   a rear wheel (15);
   an engine (4); and
   an attachment member (3) consisting of a bottom wall portion (6) and left and right side wall portions (5,5) continued to the left and right ends of said bottom wall portion (6) when viewed from ahead of the vehicle; said attachment member 3 having said engine (4) attached thereto;
   both of said front swing arms (7,8) being pivotably attached at rear end parts thereof to said side wall portions (5,5) of said attachment member (3); and
   the parts of said lower front swing arm (8) attached to said side wall portions (5,5) of said attachment member (3) being offset inwardly of the vehicle by a predetermined distance (l) from the parts of said upper front swing arm (7) attached to said side wall portions (5,5) of said attachment member (3);
   said side wall portions (5, 5) of said attachment member (3) comprise lower side wall parts (5e, 5e) upwardly and slightly sidewardly extending from the left and right ends of said bottom portion (6), inclined wall parts (5d, 5d) transversely outwardly extending by said predetermined distance (l), while slightly ascending, continuously from said lower side wall parts (5e, 5e), and upper side wall parts (5f, 5f) upwardly extending from the left and right ends of said inclined wall parts (5d, 5d), respectively, when viewed from ahead of the vehicle; and
   said rear end parts of said upper and said lower front swing arms (7, 8) are pivotably attached to said upper side wall parts (5f, 5f) and said lower side wall parts (5e, 5e) of said side wall portions (5, 5) of said attachment member (3), respectively.

* * * * *

UNITED STATES PATENT AND TRADEMARK OFFICE
CERTIFICATE OF CORRECTION

PATENT NO. : 4,700,799
DATED : October 20, 1987
INVENTOR(S) : Akio KAWANO

It is certified that error appears in the above-identified patent and that said Letters Patent is hereby corrected as shown below:

Column 1, line 55, change "freedoms" to --freedom--.
Column 3, line 52, change "Parallelogram-shaped" to --parallelogram-shaped--.
Column 4, line 38, correct the spelling of --front--.
Column 5, line 40, after "plane." change "The," to --Then,--.
Claim 1, line 11, (Column 6, line 60), change "5,5" to --(5,5)--.

Signed and Sealed this

Seventeenth Day of May, 1988

Attest:

DONALD J. QUIGG

*Attesting Officer*     *Commissioner of Patents and Trademarks*